C. REGER.
ANTISKIDDING GRIP TREAD FOR VEHICLE WHEELS.
APPLICATION FILED MAR. 30, 1916.
1,213,949.
Patented Jan. 30, 1917.
2 SHEETS—SHEET 1.
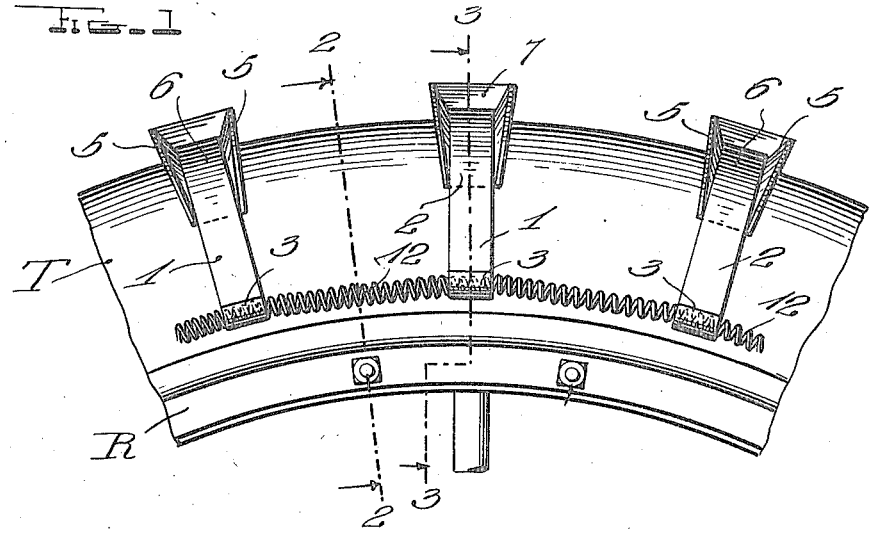
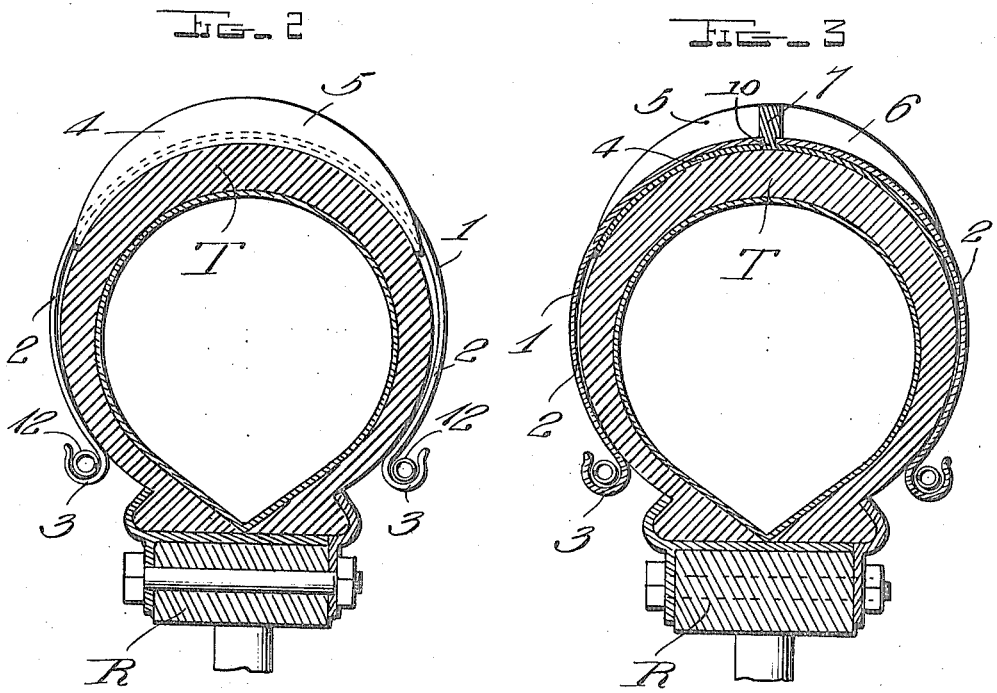
Witnesses
E. D. Haines
Inventor
Conrad Reger
By H. B. Willson & Co.
Attorneys

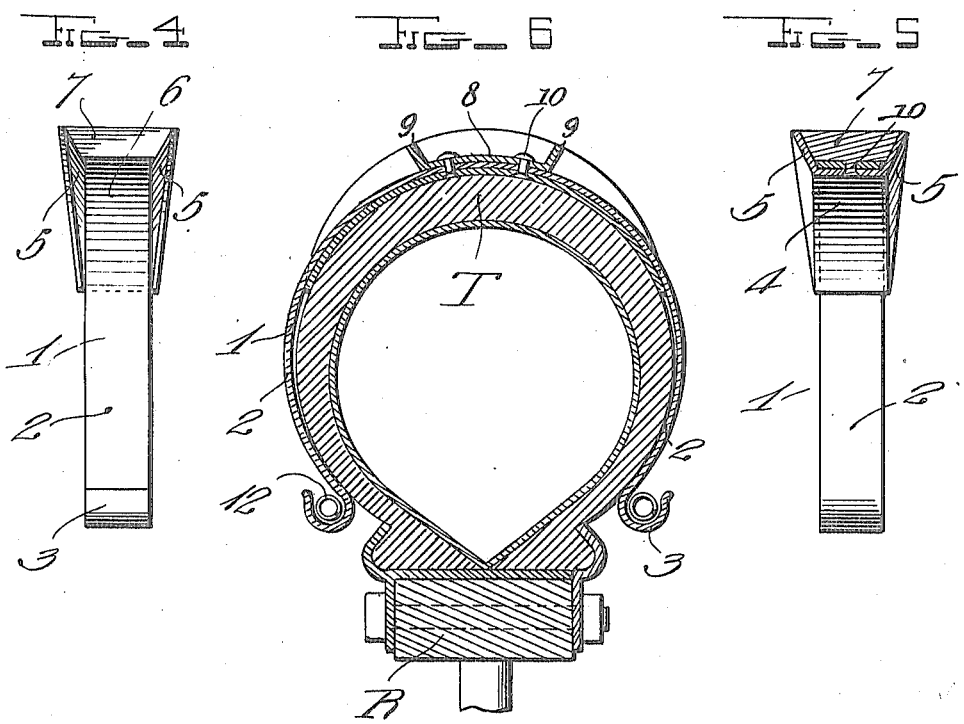

UNITED STATES PATENT OFFICE.

CONRAD REGER, OF DANVILLE, PENNSYLVANIA.

ANTISKIDDING GRIP-TREAD FOR VEHICLE-WHEELS.

1,213,949.   Specification of Letters Patent.   Patented Jan. 30, 1917.

Application filed March 30, 1916. Serial No. 87,762.

*To all whom it may concern:*

Be it known that I, CONRAD REGER, a citizen of the United States, residing at Danville, in the county of Montour and State of Pennsylvania, have invented certain new and useful Improvements in Antiskidding Grip-Treads for Vehicle-Wheels; and I do declare the following to be a full, clear, and exact description of the invention, such as will enable others skilled in the art to which it appertains to make and use the same.

This invention relates to certain new and useful improvements in antiskidding grip treads for vehicle tires.

One object of the invention is to provide a grip tread for the pneumatic tires of automobiles or other similar vehicles having an improved means for fastening the same to the tire.

Another object of the invention is to provide a grip tread of this character for automobile tires which will not in any manner injure the tire.

A further object of the invention is to provide a device of this character which will be simple, strong, durable and inexpensive in construction, efficient and reliable in operation, and well adapted to the purpose for which it is designed.

With these and other objects in view, the invention consists of certain novel features of construction, and the combination and arrangement of parts as will be hereinafter fully described and claimed.

In the accompanying drawings forming a part of the specification and in which similar reference characters designate like parts throughout the several views, Figure 1 is a side elevation of a portion of an automobile wheel, showing a device constructed in accordance with this invention applied thereto; Fig. 2 is a transverse sectional view taken on the line 2—2 of Fig. 1; Fig. 3 is a similar view taken on the line 3—3 of Fig. 1; Fig. 4 is an end elevation of one of the grip treads; Fig. 5 is a central vertical sectional view of the same; and Fig. 6 is a transverse sectional view through an automobile wheel, showing a grip tread applied thereto having a modified form of antiskidding element.

Referring more particularly to the drawings, the reference numeral 1 designates a U-shaped resilient member formed from a single strip of flat material of uniform width throughout its length. The arms 2 of the U-shaped member 1 are curved longitudinally to engage the opposite sides of the tire to which the device is applied, and have their free or inner ends curved outwardly to form attaching hooks 3.

The reference numeral 4 designates a longitudinally curved plate of uniform width throughout its length and having integral side flanges 5 forming a channel therebetween. These flanges 5 are gradually tapered from their central portions to their opposite ends, and extend outwardly in diverging relation from the side edges of said plate 4 for a purpose to be hereinafter described.

The intermediate portion of the U-shaped member 1 is disposed in the channel of the plate 4 between the flanges 5, and has its inner surface contacting with the outer surface of the plate 4. The arms 2 of the member 1 extend beyond the ends of the plate 4 for engagement with the sides of a vehicle tire to which the device is to be attached. Also disposed in the channel of the plate between the flanges 5 midway of the ends of said plate, is a clamping member. In Figs. 1 to 5 of the drawings this member is shown as being composed of a transversely extending block 7, the outer edge of which lies flush with the outer edges of the flanges 5 to partake of the nature of an anti-slipping element. In Fig. 6 the clamping member consists of a longitudinally arranged arcuate plate 8 having its ends upturned to form anti-slipping lugs 9, the latter also extending transversely of the plate 4 and having their outer edges flush with the outer edges of the flanges 5.

The end of the block 7, as well as the ends of the lugs 9 of the plate 8, are beveled to snugly fit between the outwardly diverging flanges 5, thereby forming a means for bracing the latter.

The central portion of the U-shaped member 1 is disposed between the central portion of the plate 4 and the clamping member, whichever form is preferred, and secured in position by rivets 10, the latter serving as the sole means for securing the clamping member, the U-shaped member 1, and the plate 4 together. The block 7 is provided with a single integrally formed rivet 10, while the plate 8 is provided with a pair of detachable or separate rivets. By securing the U-shaped member 1 to the central portion of the plate 4 in the channel of the same between the flanges 5, the arms 2 of this member 1 are free to swing outwardly from their portions clamped between the clamping member and the central portion of the plate 4 when the device is being inserted upon the tire.

The device is designed to be applied to a vehicle wheel having a rim R and a tire T, a plurality of the aforesaid grip treads being arranged in spaced relationship around the periphery of the latter. As will be readily understood, the resilient arms 2 of the U-shaped member 1 engage the opposite sides of the tire T and prevent angular and sidewise movement of the treads.

The reference numeral 12 represents the substantially circular side pieces which are passed through the hooks 3 at the ends of the arms 2. This, as will be readily understood, more securely holds the grip treads in place on the tire. These side pieces 12 are here shown in the form of coiled springs, but it is to be understood that any other equivalent means may be substituted for them. A device constructed in this manner will be found to be very efficient in preventing the rubber tires of motor vehicles from skidding on slippery streets.

It is to be understood that I do not wish to be limited to the number of tread plates, as obviously as many as desired or may be convenient, may be employed.

From the foregoing description, taken in connection with the accompanying drawings, the operation and construction of the invention will be readily understood without a more extended explanation.

As various changes in form, proportion, and in the minor details of construction may be resorted to without departing from the spirit of the invention, I do not wish to be limited to the construction herein shown and described other than that set forth in the appended claims.

I claim:—

1. A device of the class described comprising a longitudinally curved channeled plate adapted to fit snugly transversely around the tread of a tire, a clamping member disposed in the channel of said plate midway of the ends of the latter and having an anti-slipping element thereon, a U-shaped member having its intermediate portion disposed in the channel of said plate and its central portion clamped between the central portion of the latter and said clamping member, and means for securing the said clamping member, said U-shaped member, and said plate together.

2. A device of the class described comprising a longitudinally curved channeled plate adapted to fit snugly transversely around the tread of a tire, a short arcuate clamping plate disposed longitudinally in the channel of said curved plate midway of the ends of the latter, and having an anti-slipping element thereon, a U-shaped member having its intermediate portion disposed in the channel of said curved plate, and its central portion clamped between the central portion of the latter and said clamping plate, and means for securing said clamping plate, said member, and said curved plate together.

In testimony whereof I have hereunto set my hand in presence of two subscribing witnesses.

CONRAD REGER.

Witnesses:
WM. KASEWEST,
FRANK M. IRVING.